United States Patent
Katiyar et al.

(10) Patent No.: US 9,456,307 B2
(45) Date of Patent: *Sep. 27, 2016

(54) ELECTRONIC DEVICE WITH MAPPING CIRCUITRY

(71) Applicant: Apple Inc., Cupertino, CA (US)

(72) Inventors: Vivek Katiyar, Los Gatos, CA (US); Andrzej T. Baranski, Santa Clara, CA (US); Dhaval N. Shah, Fremont, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 13/904,838

(22) Filed: May 29, 2013

(65) Prior Publication Data

US 2014/0357316 A1    Dec. 4, 2014

(51) Int. Cl.
H04M 1/00    (2006.01)
H04W 4/02    (2009.01)
G01C 3/08    (2006.01)
G01C 15/00   (2006.01)

(52) U.S. Cl.
CPC .............. *H04W 4/026* (2013.01); *G01C 3/08* (2013.01); *G01C 15/002* (2013.01)

(58) Field of Classification Search
None
See application file for complete search history.

(56) References Cited

U.S. PATENT DOCUMENTS

| | | | |
|---|---|---|---|
| 5,429,008 A * | 7/1995 | Matsumoto | A63B 59/0074 73/862.639 |
| 7,516,039 B2 | 4/2009 | McKitterick | |
| 8,274,507 B2 | 9/2012 | Becker et al. | |
| 8,398,246 B2 | 3/2013 | Rutledge et al. | |
| 8,583,296 B2 * | 11/2013 | Allen | B64D 45/00 701/4 |
| 2009/0293012 A1 * | 11/2009 | Alter | G01C 21/20 715/810 |
| 2009/0303042 A1 * | 12/2009 | Song | G08B 13/19647 340/566 |
| 2012/0253751 A1 * | 10/2012 | Malka | G01C 15/00 703/1 |
| 2013/0223189 A1 * | 8/2013 | Davis, III | G01C 15/00 367/99 |
| 2014/0253904 A1 * | 9/2014 | Gogolla | G01C 3/08 356/4.01 |
| 2014/0266669 A1 * | 9/2014 | Fadell | G05B 19/042 340/501 |
| 2015/0085301 A1 * | 3/2015 | Becker | G01B 11/26 356/608 |
| 2015/0143601 A1 * | 5/2015 | Longinotti-Buitoni | A61B 5/0002 2/69 |
| 2015/0204983 A1 * | 7/2015 | Georgy | G01S 19/49 701/469 |

FOREIGN PATENT DOCUMENTS

EP    1273882    1/2010
WO    2008059279    5/2008

* cited by examiner

Primary Examiner — Lana N Le
(74) Attorney, Agent, or Firm — Treyz Law Group, P.C.; Zachary D. Hadd (57) ABSTRACT

An electronic device may be provided with electronic components such as mapping circuitry for measuring distances, areas, volumes or other properties of objects in the surrounding environment of the device. The mapping circuitry may include a laser sensor and device position detection circuitry. The device may include processing circuitry configured to gather laser sample data and device position data using the laser sensor and the device position detection circuitry. The laser sample data and the device position data may be gathered while pointing a laser beam generated with a laser in the laser sensor at one or more sample points on a surface such as a surface of a wall. By tracking the device position and orientation using the device position detection circuitry, the objects may be mapped while gathering laser sample data from any position with respect to the object.

19 Claims, 11 Drawing Sheets

ELECTRONIC DEVICE WITH MAPPING CIRCUITRY

BACKGROUND

This relates generally to electronic devices and, more particularly, to electronic devices with mapping circuitry for measuring sizes, shapes, distances, and other attributes of environmental objects.

Laser distance measuring devices include a laser and a sensor. The laser generates a laser beam that is reflected off of surfaces such as walls in a room. By detecting the reflected beam, a device can measure the distance to the surface. This type of laser distance measuring device sometimes includes area or volume measuring capabilities. For example, in a volume measuring mode, the device may instruct a user to sequentially measure the width, length, and height of a room using the device. The device can then compute a volume using the measured width, length, and height.

Conventional laser measuring devices measure only the distance from the device to a given surface. These devices are unable to measure distances between multiple points that are separate from the device and therefore require the user to place the device is specific locations for which measurements are desired. This can be difficult in, for example, a furnished room with items that restrict access to all parts of the room.

Additionally, these devices can be bulky pieces of equipment that require batteries or battery packs and must be purchased and transported separately from other equipment and electronic devices.

It would therefore be desirable to be able to provide improved electronic devices with mapping circuitry.

SUMMARY

An electronic device may be provided with electronic components such as mapping circuitry.

The mapping circuitry may include a laser sensor and positioning circuitry such as device position detection circuitry. The laser sensor may include a light-emitting component and a light sensor. The light-emitting component may be a coherent light source such as a laser. The light sensor may be configured to detect reflected portions of the light emitted by the light-emitting component.

The positioning circuitry may include one or more accelerometers, one or more gyroscopes, satellite navigation system receiver circuitry such as Global Positioning System (GPS) receiver circuitry or other circuitry for determining and monitoring the position and orientation of the device.

During mapping operations, a user may select a mapping application using the display (e.g., using touch sensors in a touch-sensitive display). The mapping application may be implemented using software running on processing circuitry in the device.

The mapping application may receive device position data from the positioning circuitry and laser sample data from the laser sensor. Laser sample data may be gathered by pointing the laser at a location on a surface and gathering sensor data using the light sensor. Laser sample data may be gathered while pointing the laser at multiple sample points on a single surface, at multiple sample points on multiple surfaces, may be continuously gathered while moving the laser across one or more surfaces, etc. For each sample point at which laser data is gathered, device position data from the positioning circuitry (e.g., accelerometer data and gyroscope data) may also be gathered.

The mapping application may combine the gathered laser sample data and the gathered device position data to generate sample position data for each sample point. The sample position data for multiple sample points may be combined to form surface data, area data, volume data, distance data, square footage data, virtual images of a surface, virtual images of a room, virtual images of a structure or other object or may other mapping data. The mapping data may be stored and/or displayed to a user.

Further features of the invention, its nature and various advantages will be more apparent from the accompanying drawings and the following detailed description of the preferred embodiments.

DETAILED DESCRIPTION

An electronic device may be provided with electronic components such as mapping circuitry, a display, communications circuitry, and other electronic components.

The mapping circuitry may include a laser sensor and positioning circuitry. During mapping operations with the electronic device, laser sample data and device position data may be gathered at multiple sample points on one or more surfaces. The positioning circuitry may be used to determine the device position and orientation at each point at which laser sample data is gathered. In this way, distances between sample points, surface mapping data, volume mapping data or other mapping data may be gathered while freely moving the device.

For example, a user may stand in a room and aim a laser beam generated by the laser sensor at a wall. The user may gather laser sample data while pointing the laser at first, second, and third points on the wall. The user can freely move the device between sample points. As the user moves the device, the positioning circuitry monitors the position and orientation of the device. When the user gathers laser sample data at the second and third sample points, the positioning circuitry can determine the relative position and orientation of the device with respect to the position and orientation of the device during the first sample point measurement or with respect to a global coordinate system established at the outset of mapping operations.

Figure 1:
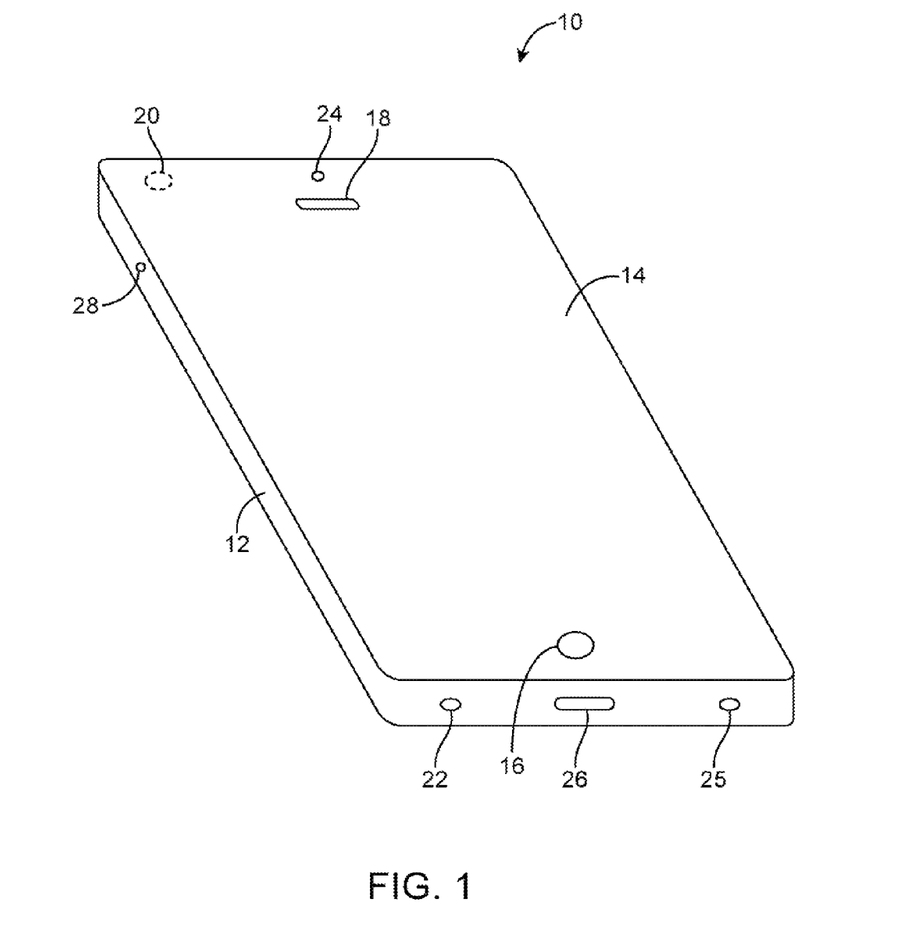
FIG. 1 is a perspective view of an illustrative electronic device with mapping circuitry in accordance with embodiments of the present invention.

An illustrative electronic device that may be provided with mapping circuitry is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, or other electronic equipment.

As shown in the example of FIG. 1, device 10 may include a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels (e.g., to increase or decrease the brightness of the image produced by display pixels) and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. Display 14 may include a rectangular ring-shaped region that surrounds the periphery of the active display region that does not contain any active display pixels and may therefore sometimes be referred to as the inactive region of display 14. The display cover layer or other display layers in display 14 may be provided with an opaque masking layer in the inactive region to hide internal components from view by a user. Openings may be formed in the opaque masking layer to accommodate light-based components. For example, an opening may be provided in the opaque masking layer to accommodate a light sensor such as light sensor 24.

Light sensor 24 may be an ambient light sensor, a proximity sensor, a laser sensor, or other light-sensitive component.

One or more openings may be formed in housing 12. As shown in FIG. 1, housing 12 may include an opening such as opening 22 for receiving an audio jack, an opening such as opening 26 for receiving a connector (e.g., a Universal Serial Bus (USB), a 30-pin connector, or a combination power and bus connector), an opening such as opening 25 for audio components such as speakers and microphones or other openings.

Mapping circuitry such as a laser sensor may be mounted behind one or more openings such as openings 22, 26, or 25 so that a laser beam may be project out of the opening onto a surface of an object in the surrounding environment. A laser sensor of this type may include a light transmitter and a light sensor. Portions of the laser beam that are reflected back at device 10 may be detected by the light sensor portion of the laser sensor. The laser sensor may be mounted adjacent to, or behind, other electronic components (e.g., speakers, microphones, audio jack circuitry, etc.) within one of openings 22, 25, and/or 26 in housing 12 and/or openings 18 and/or 24 in display 14. However, this is merely illustrative. If desired, a laser sensor may be mounted behind a dedicated opening in housing 12.

For example, housing 12 may include one or more laser sensor openings such as opening 20 along a side of the device, opening 28 on a top edge of the device, or other dedicated openings on front, rear, and or sidewall surfaces of the device.

Device 10 may include one laser sensor that projects a laser beam from a single surface of device 10 or may include multiple laser sensors that simultaneously or separately project laser beams from multiple surfaces of device 10. If desired, device 10 may include multiple laser sensors that project laser beams from a common surface of device 10.

During operation of device 10, a laser sensor may project a laser beam from an opening in device 10, detect reflected portions of the laser beam, and provide laser sample data to processing circuitry in the device. At the same time that laser sample data is being gathered, additional mapping circuitry such as device positioning circuitry (e.g., one or more accelerometers and one or more gyroscopic sensors) may provide device position data to the processing circuitry. The processing circuitry may combine the laser sample data and the device position data to measure distances, areas, volumes, to generate mathematical representations of surfaces such as walls, or to generate other mapping data associated with surfaces at which the laser beam was pointed during mapping operations.

Figure 2:
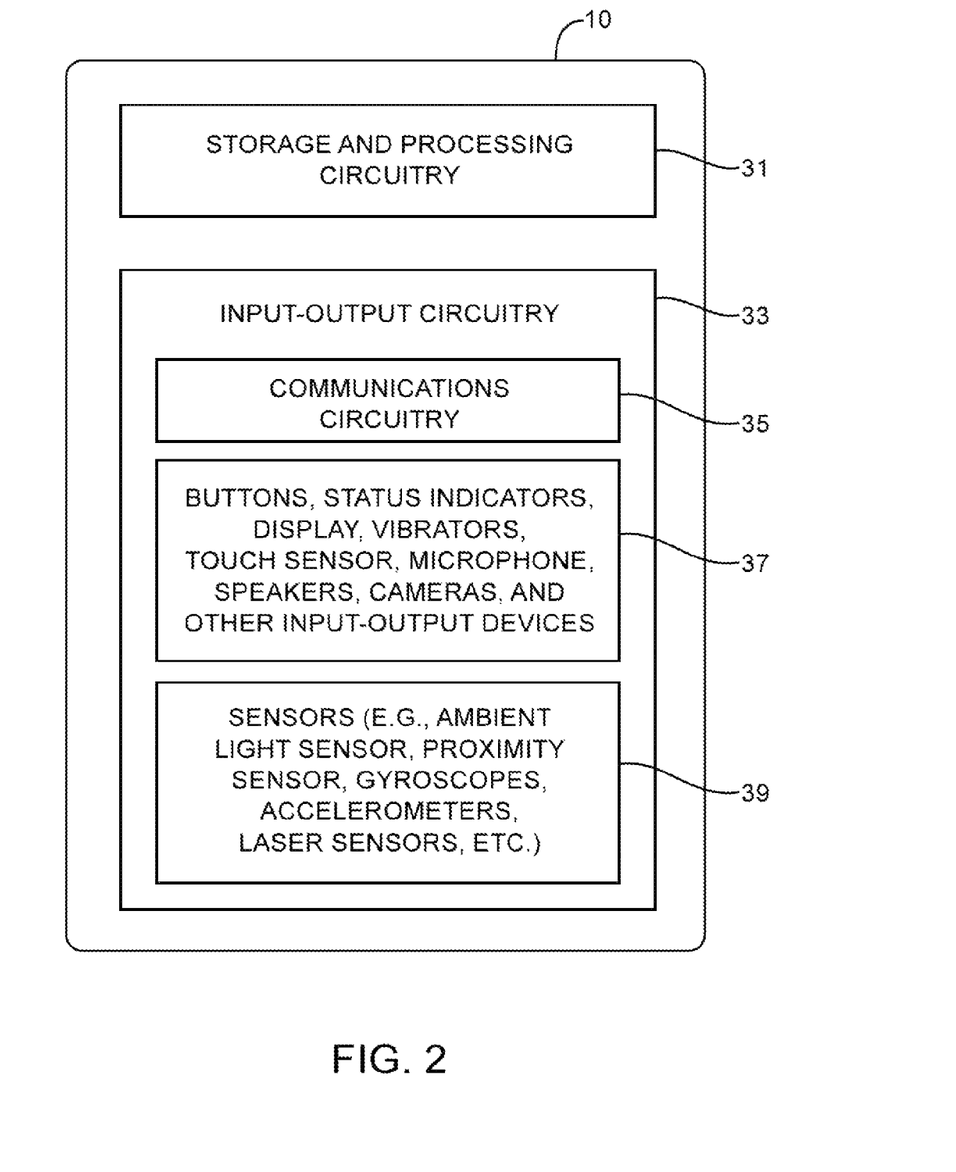
FIG. 2 is a schematic diagram of an illustrative electronic device with mapping circuitry in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 31. Storage and processing circuitry 31 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 31 may be used in controlling the operation of device 10. The processing circuitry may be based on a processor such as a microprocessor and other suitable integrated circuits. With one suitable arrangement, storage and processing circuitry 31 may be used to run software on device 10, such as internet browsing applications, email applications, media playback applications, operating system functions, software for capturing and processing images, software implementing functions associated with gathering and processing sensor data, mapping applications, other laser feedback applications, touch sensor functionality, etc.

Input-output circuitry 33 may be used to allow data to be supplied to device 10 and to allow data to be provided from device 10 to external devices.

Input-output circuitry 33 may include wired and wireless communications circuitry 35. Communications circuitry 35 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 33 may include input-output devices 37 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 39 of FIG. 2 may include an ambient light sensor for gathering information on ambient light levels, proximity sensors, and laser sensors. Proximity sensors and laser sensors may include light-emitting components and light sensors. Light-sensitive components (light sensors) of ambient light sensors, proximity sensors, and/or laser sensors, may include one or more semiconductor detectors (e.g., silicon-based detectors) or other light detection circuitry. Sensors 39 may also include a pressure sensor, a temperature sensor, device positioning circuitry such as one or more accelerometers and/or one or more gyroscopes, and other circuitry for making measurements of the environment surrounding device 10.

Figure 3:
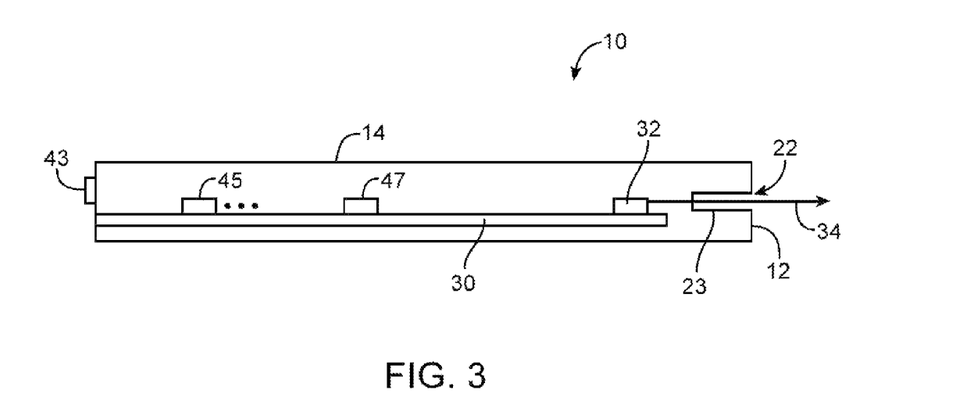
FIG. 3 is a cross-sectional side view of an illustrative electronic device showing how a laser sensor may project a laser beam through an opening in the housing of the electronic device in accordance with an embodiment of the present invention.

As shown in the side view of FIG. 3, a laser sensor such as laser sensor 32 may be mounted on circuitry such as printed circuit 30 within housing 12 of device 10. Printed circuit 30 may be a rigid printed circuit board (e.g., a printed circuit board formed from fiberglass-filled epoxy or other rigid printed circuit board material) or, if desired, a flexible printed circuit (e.g., a printed circuit formed from a polyimide substrate or other layer of flexible polymer). Components such as components 45 may be mounted on printed circuit 30. Components 45 may be, for example, integrated circuits, connectors, switches, application specific integrated circuits, processors, memory, input-output components such as circuitry 33 of FIG. 2, communications circuits (e.g., wired or wireless communications circuits such as communications circuitry 35), and other circuitry for supporting the operation of device 10.

Device 10 may include one or more buttons such as button 43 along an edge of housing 12. Button 43 may be a power control button for powering device 10 on and off, a sleep button for putting device 10 into a low power sleep mode), a camera shutter button, etc. Button 43 may be used to operate mapping circuitry within device 10. For example, when device 10 is in a mapping mode of operation, a user may compress button 43. Compressing button 43 may activate laser sensor 32 to generate laser beam 34 or may cause circuitry in the device to gather sample data such as a sample of laser data and a sample of device position data.

Device position data may be generated by device position detection circuitry such as positioning circuitry 47 (e.g., an inertial mass unit containing one or more accelerometers and one or more gyroscopes for tracking and determining the position and orientation of device 10). Positioning circuitry 47 may be attached to a common printed circuit with laser sensor 32, to a separate printed circuit from laser sensor 32, or may be coupled to common circuitry (e.g., processing circuitry) with laser sensor 32 by one or more flexible printed circuits or other connecting circuitry. Positioning circuitry 47 may, for example, include a three-axis accelerometer and a three-axis microelectromechanical systems (MEMS) based gyroscope attached to a main logic board of device 10.

In the example of FIG. 3, laser sensor 32 emits laser beam 34 through audio jack opening 22. Surfaces such as surface 23 of audio jack opening 22 may include contacts for electrical communications with a jack that is inserted into opening 22 (e.g., a headphones jack, a speaker jack, etc.) However, this is merely illustrative. If desired, laser sensor 32 may emit laser beam 34 through any suitable opening in housing 12, display 14 or other portions of device 10.

Figure 4:
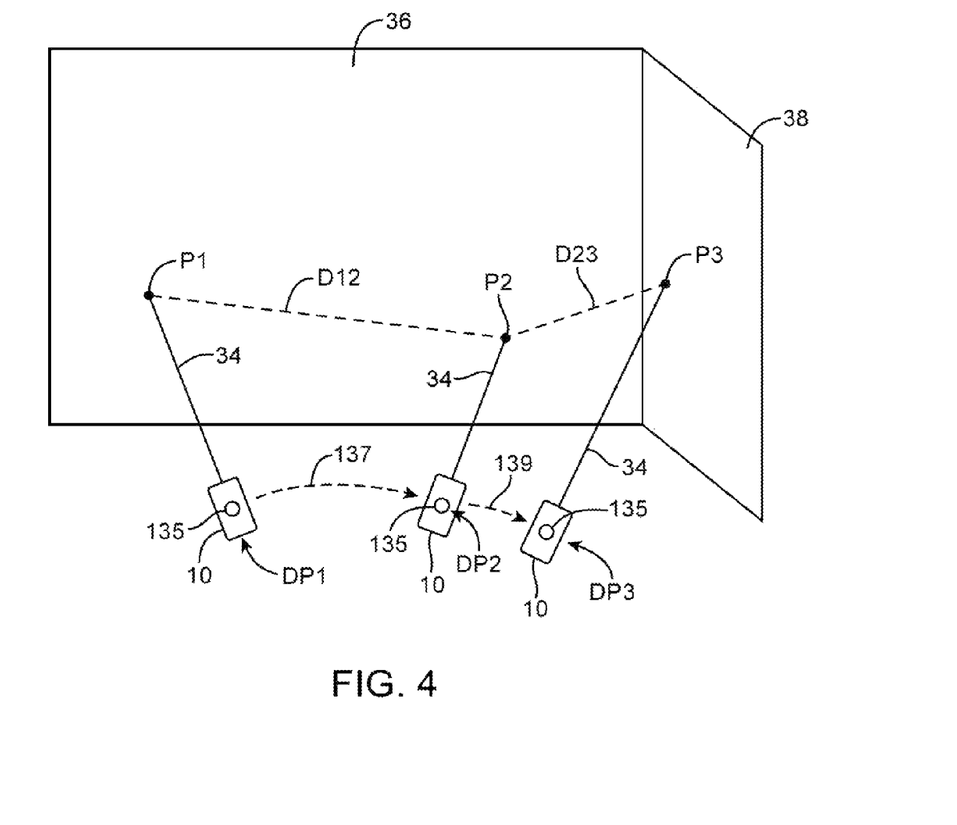
FIG. 4 is a diagram showing how a device may use a laser beam to gather sample data at one or more sample points on one or more surfaces from one or more positions in accordance with an embodiment of the present invention.

During operation of device 10, while device 10 is in a mapping mode, laser beam 34 may be used to measure distances to surfaces of objects as shown in the diagram of FIG. 4. As shown in FIG. 4, device 10 may emit laser beam 34 in the direction of surfaces such as walls 36 and 38. For example, a user may point laser beam 34 at a first point such as point P1. If desired, a button such as button 43 of FIG. 2 or button 16 of FIG. 1 may be used to activate sampling of data at each sample point. However, this is merely illustrative. If desired, virtual controls such as virtual button 135 may be displayed on display 14 during mapping operations that can be activated using touch-sensitive circuitry in the display for activating sampling of data at each sample point.

Activating sampling of data may include gathering a sample of data while pulsing laser beam 34, gathering a sample of data while laser beam 34 is continuously illuminated, continuously gathering samples of data while pulsing laser beam 34, or continuously gathering samples data of data while laser beam 34 is continuously illuminated.

Device 10 may be used to gather laser sample data and device position data while device 10 is at device position DP1 and laser beam 34 is aimed at point P1. The user may then move device 10 in a direction such as direction 137 to device position DP2 so that laser beam 34 is pointed at sample point P2. Device 10 may be used to gather additional laser sample data and additional device position data while device 10 is at device position DP2 and laser beam 34 is incident on point P2. Mapping circuitry of device 10 may be used to measure distance D12 along wall 36 between sample point P1 and sample point P2, if desired, by measuring the change in position and orientation of device 10, measuring the distance of points P1 and P2 from device 10, and performing trigonometric computations using the measured position changes and distances.

If it is desired (for example) to generate an equation defining the plane of wall 36 data at three or more sample points on wall 36 may be gathered.

Device 10 may also be used to measure distances between locations such as points on walls 36 and 38. As shown in FIG. 4, a user may move device 10 in a direction such as direction 139 to device position DP3 so that laser beam 34 is pointed at sample point P3 on wall 38. Device 10 may be used to gather additional laser sample data and additional device position data while device 10 is at device position DP3 and laser beam 34 is incident on point P3. Mapping circuitry of device 10 may be used to measure distance D23 between sample point P2 on wall 36 and sample point P3 on wall 38, if desired, by measuring the change in position and orientation of device 10 and measuring the distance of points P2 and P3 from device 10. By gathering and combining laser sample data and corresponding device position data from a suitable number of data points, device 10 may generate mapping data for one wall, two walls, three walls, four walls, and/or one or more other objects.

For example, if it is desired to generate mapping data that describes both walls 36 and 38, laser sample data and corresponding device position data may be gathered for three or more sample points on wall 36 and three or more sample points on wall 38. Device position data may include relative changes in three linear directions (e.g., orthogonal x, y, and z positions relative to an initial position) and relative changes in three angular directions (e.g., orthogonal theta_1, theta_2, and theta_3 orientations relative to an initial orientation) describing the location and orientation of device 10. For example, a linear displacement of device 10 may generate changes in the measured x, y, and/or z positions of device 10 (as measured by an accelerometer) and a rotation of device 10 about one or more axes may generate changes in the theta_1, theta_2, and/or theta_3 angular orientations of device 10 (as measured by a gyroscope). At each sample point, x, y, z, theta_1, theta_2, and theta_3 data in addition to a range (distance) measurement between device 10 and a sample point on an object may be gathered and stored.

Figure 5:
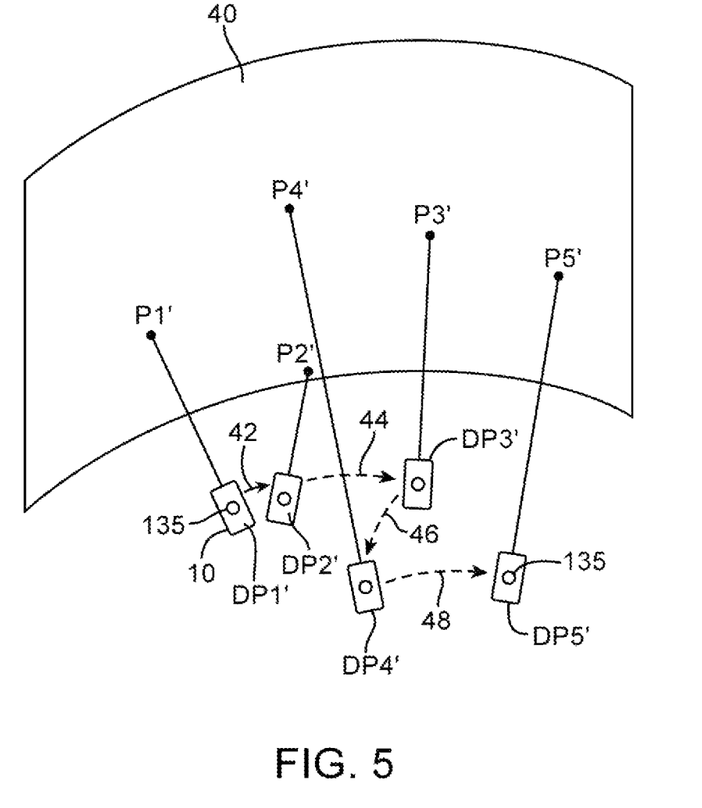
FIG. 5 is a diagram showing how a device may use a laser beam to gather sample data at one or more sample points on a curved surface from one or more positions in accordance with an embodiment of the present invention.

The example of FIG. 4 in which device 10 is used to map planar surfaces is merely illustrative. If desired, device 10 may be used to map objects having other shapes such as curved wall 40 of FIG. 5. During mapping operations, a user may select a curved surface mapping mode in which more than three sample points are to be used. In the example of FIG. 5, laser sample data and device position data is gathered at five sample points P1', P2', P3', P4', and P5' while device 10 is located at device positions DP1', DP2', DP3', DP4', and DP5' respectively. Mapping circuitry such as positioning circuitry 47 may track the changes in position and orientation of device 10 as device 10 is moved in direction 42 from point DP1' to point DP2', in direction 44 from point DP2' to point DP3', in direction 46 from point DP3' to point DP4', and in direction 48 from point DP4' to point DP5'. In this way, sample data may be gathered while device 10 is in any position or orientation with respect to a surface such as curved wall 40. Display 14 may be used to prompt a user of device 10 to gather any suitable number of data samples for mapping an object having any arbitrarily complicated shape.

Figure 6:
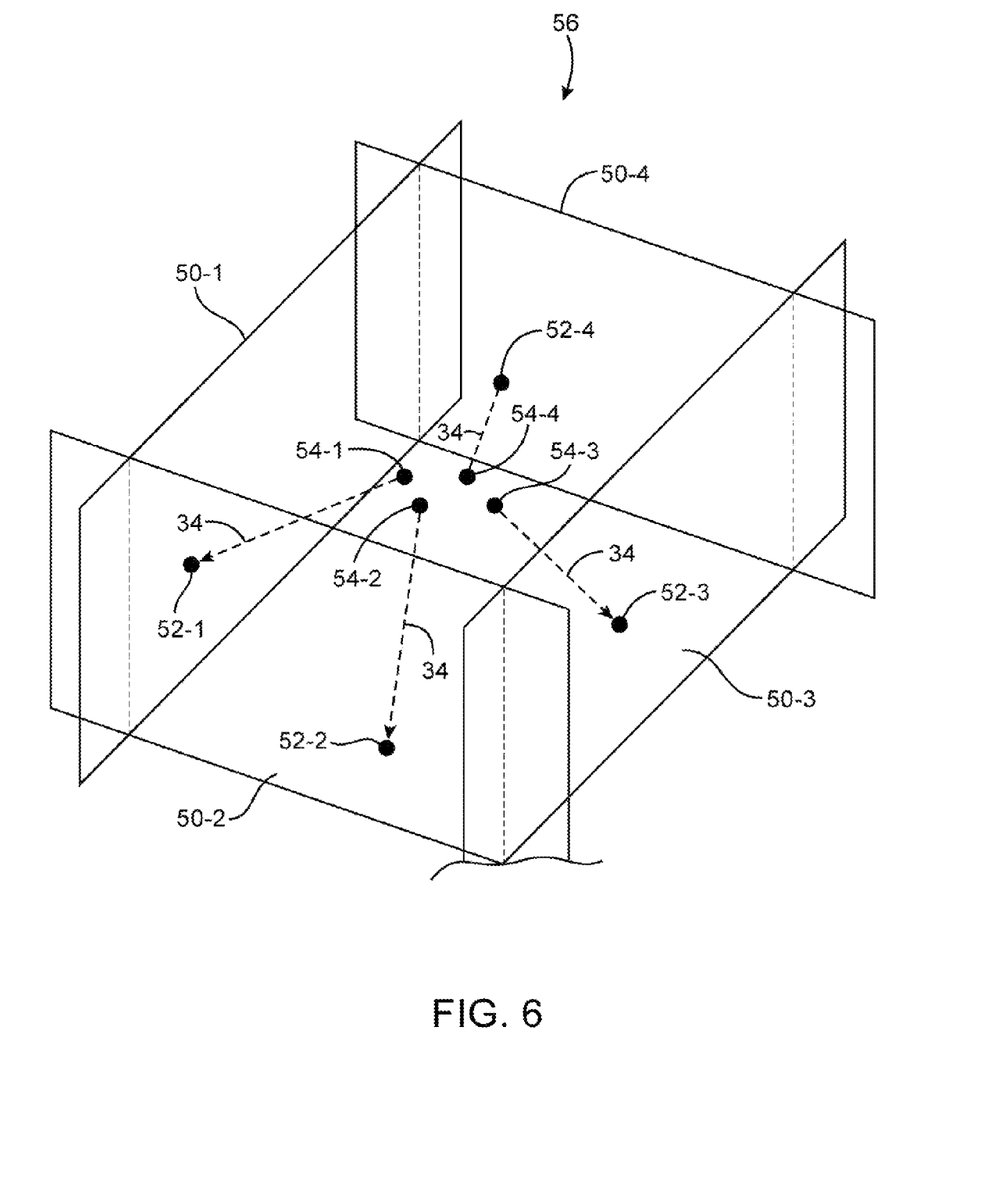
FIG. 6 is a diagram showing how a device may use a laser beam to gather sample data for volumetric measurements from one or more positions in a room in accordance with an embodiment of the present invention.

FIG. 6 is a diagram showing how device 10 may be used to map a room (e.g., to compute the volume of the room, to create a virtual model of the room, to compute an area of a floor in a room, etc.) by gathering sample data using laser sensor 32 and positioning circuitry 47 from any device positions in the room. In the example of FIG. 6, room 56 has four walls 50-1, 50-2, 50-3, and 50-4. Device 10 may be used to gather sets of sample data on each wall of room 56.

For example, device 10 may be used to gather sample data while projecting laser beam 34 from a position such as device position 54-1 onto a point such as sample point 52-1 on wall 50-1. Device 10 may then be moved to device position 54-2 and used to gather sample data while projecting laser beam 34 from device position 54-2 onto a point such as sample point 52-2 on wall 50-2. Device 10 may then be moved to device position 54-3 and used to gather sample data while projecting laser beam 34 from position 54-3 onto a point such as sample point 52-3 on wall 50-3. Device 10 may then be moved to device position 54-4 and used to gather sample data while projecting laser beam 34 from device position 54-4 onto a point such as sample point 52-4 on wall 50-4. If desired, sample data may be gathered at one or more, two or more, or three or more sample points on each wall, on the floor, on the ceiling, and/or on other surfaces of room 56 in order to map the area, volume, or other properties of room 56.

Figure 7:
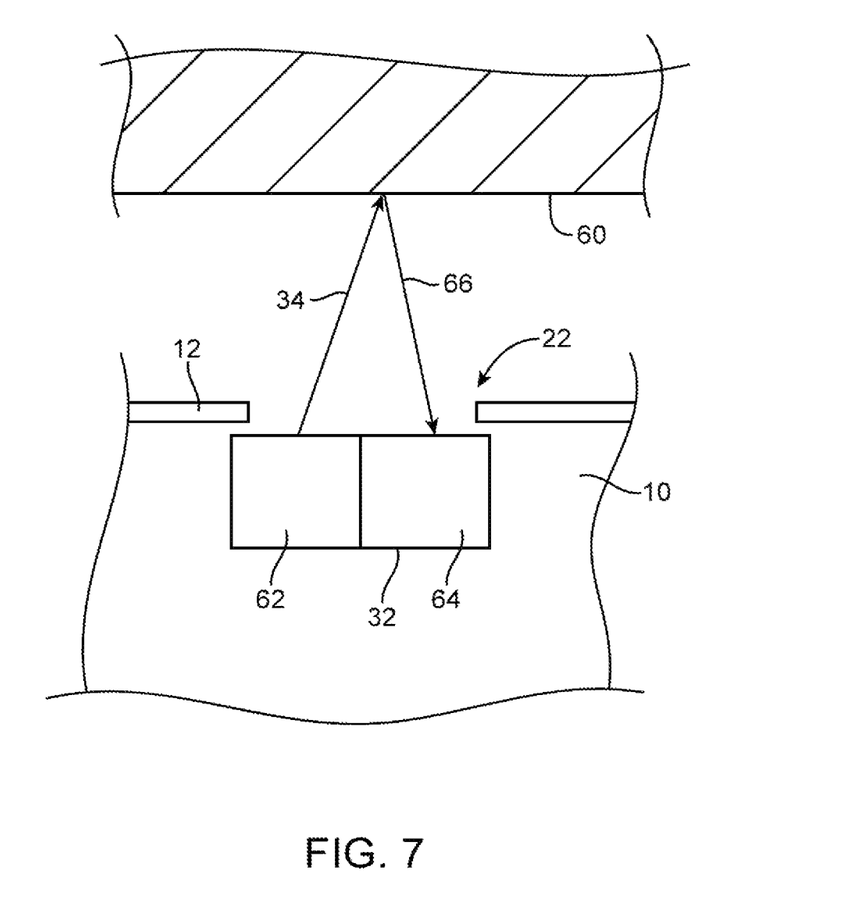
FIG. 7 is a diagram showing how a reflected portion of a laser beam from a light-emitting component of a laser sensor may be detected using a light sensor of the laser sensor in accordance with an embodiment of the present invention.

FIG. 7 is a cross-sectional view of a portion of device 10 showing how laser sensor 32 may include a light-emitting portion and a light sensor portion. As shown in FIG. 7, laser sensor 32 may include a light-emitting portion such as laser 62 and a light-sensitive portion such as light sensor 64. Laser 62 may emit laser beam 34 through an opening such as audio port opening 22 in housing 12. Laser beam 34 may be a visible light laser beam, an infrared laser beam, etc. Laser beam 34 may reflect from a surface such as surface 60 (e.g., the surface of a wall or other environmental object or structure). Reflected portion 66 of laser beam 34 may pass back through opening 22 and onto light sensor 64. Based on the time between emission of laser beam 34 and detection of reflected portion 66 (and using the known speed of light), the distance between device 10 and surface 60 may be determined. However, this is merely illustrative, light sensor 64 may detect changes in phase or other changes in laser beam 34 that allow measurement of the distance between device 10 and surface 60.

Figure 8:
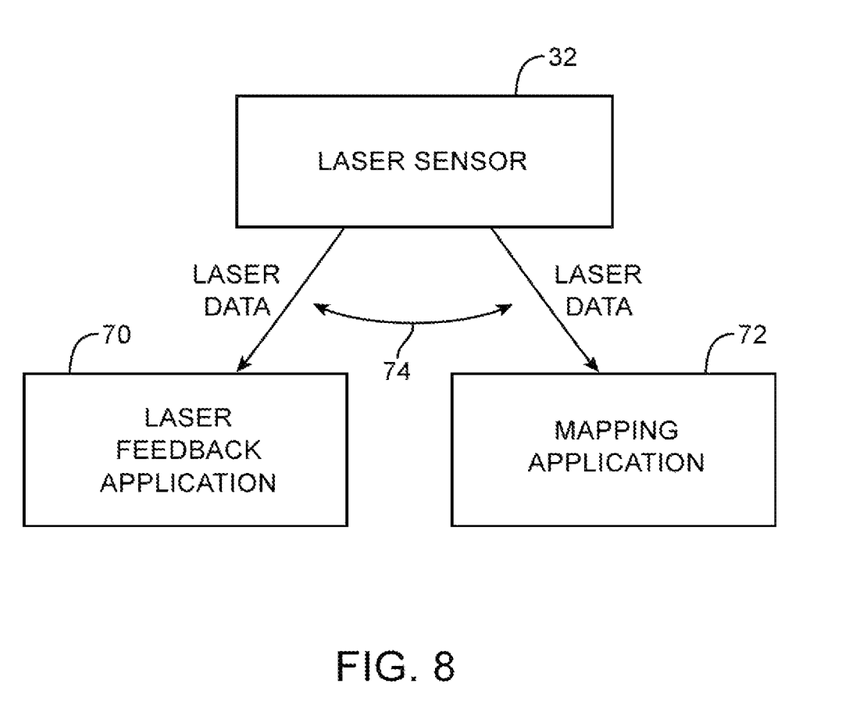
FIG. 8 is a diagram showing how a laser sensor may provide laser data to a mapping application and other applications in accordance with an embodiment of the present invention.

If desired, laser data from laser sensor 32 may also be used by other applications in device 10. As shown in FIG. 8, for example, laser data may be switchably provided to mapping application 72 (e.g., an application for performing the mapping operations described above in connection with FIGS. 1, 2, 3, 4, 5, 6, and/or 7) and another application such as laser feedback application 70 as indicated by arrows 74.

Laser feedback application 70 may be any other suitable application that uses reflected laser light as user input. For example, application 70 may use laser 62 of laser sensor 32 to project an image of a computer keyboard onto a surface such as a table. Laser feedback application 70 may generate user keyboard input data based on reflected portions of the laser light when a user's finger touches an image of a key on the projected image of the computer keyboard. In this way, a laser sensor such as laser sensor 32 may be used during mapping operations and other operations for device 10.

Figure 9:
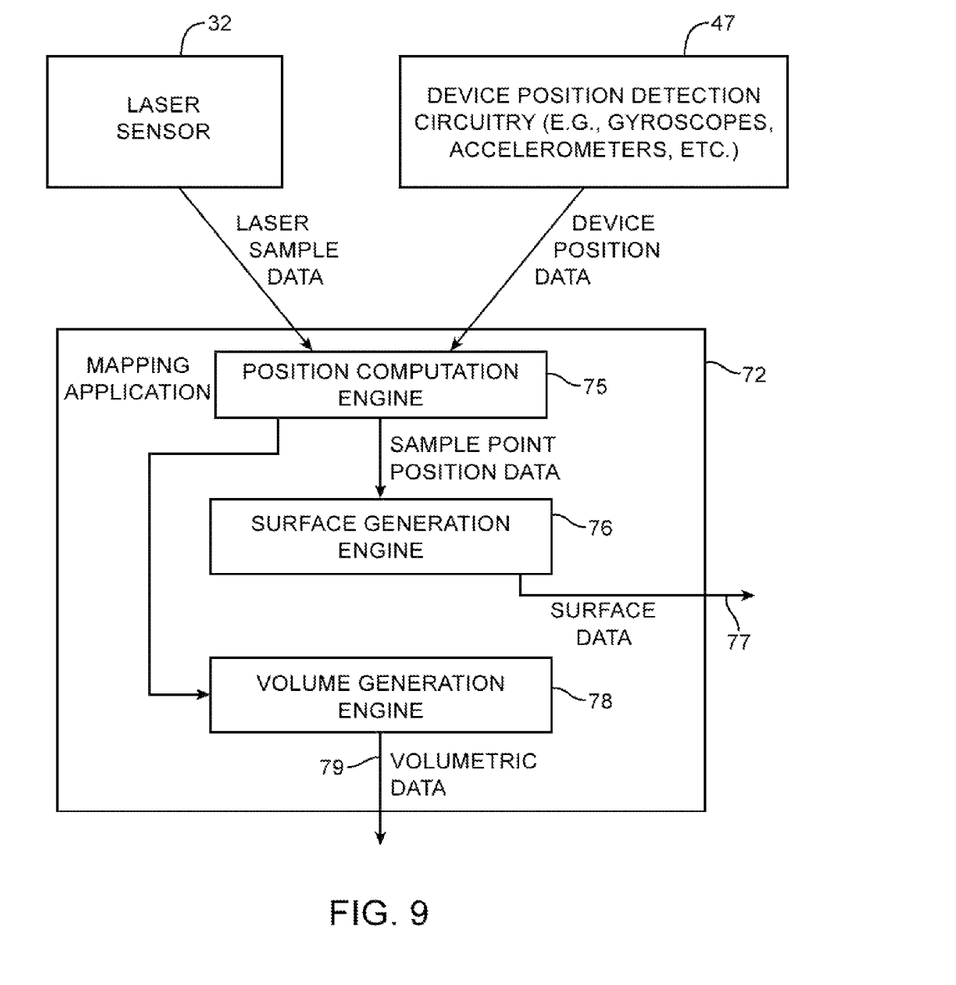
FIG. 9 is a flow diagram showing how laser sample data and device position data may be combined to form mapping data in accordance with an embodiment of the present invention.

FIG. 9 is a flow diagram showing how mapping application 72 may combine laser sample data and device position data to form mapping data associated with surfaces, distances, areas, volumes, or other attributes of objects in the surrounding environment of device 10.

As shown in FIG. 9, laser sample data from laser sensor 32 and device position data from device positioning circuitry such as device position detection circuitry 47 (e.g., one or more gyroscopes, one or more accelerometers, etc.) may be provided to mapping application 72. Mapping application 72 may be implemented using hardware and/or software applications running on, for example, processing circuitry 31 of FIG. 2.

Mapping application 72 may include position computation engine 75, surface generation engine 76, and volume generation engine 78. Position computation engine 75 may combine laser sample data and device position data from one or more sample points to generate sample point position data such as an X, Y, and Z position of each sample point in a common coordinate system. The common coordinate system may be established prior to commencement of mapping operations or may be chosen to be one of the positions of device 10 during mapping operations.

The sample point position data may be provided to surface generation engine 76 and/or volume generation engine 78.

Surface generation engine 76 may be used to map surfaces such as planar or curved wall surfaces using the sample point position data. Mapping surfaces may include determining coefficients of mathematical equations that describe the locations of the surfaces in the established coordinate system, generating images of the surfaces, computing areas of the surfaces, etc. As indicated by arrow 77, surface data of this type may be transmitted from mapping application 72 to external circuitry within device 10 or may be transmitted to other devices (e.g., using communications circuitry 35 of FIG. 2).

Volume generation engine 78 may be used to map volumes such as cubic or other shaped room, house, or building interior volumes using the sample point position data. Mapping volumes may include determining coefficients of mathematical equations that describe the locations of the surfaces that encapsulate the volume in the established coordinate system, generating images of the surfaces, computing volumes of the encapsulated surfaces, generating virtual (e.g., three-dimensional) images of the volume, etc. As indicated by arrow 79, volumetric data of this type may be transmitted from mapping application 72 to external circuitry within device 10 or may be transmitted to other devices (e.g., using communications circuitry 35).

Figure 10:
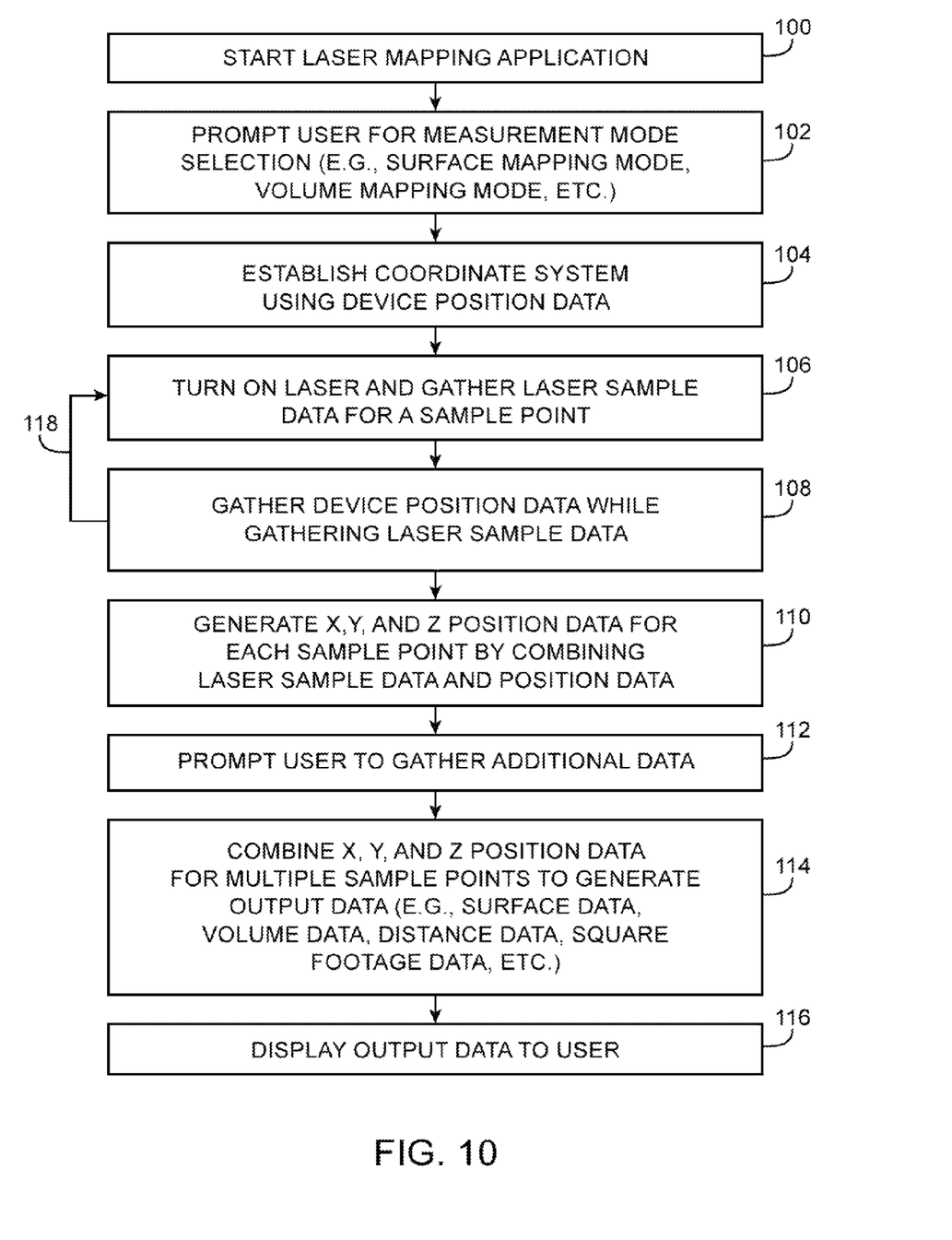
FIG. 10 is a flow chart of illustrative steps involved gathering mapping data using an electronic device with mapping circuitry in accordance with an embodiment of the present invention.

FIG. 10 is a flow chart of illustrative steps that may be involved in mapping surfaces and/or volumes using mapping circuitry such as laser sensor 32, positioning circuitry 47, and processing circuitry 18 of device 10.

At step 100, a user may start a laser mapping application such as mapping application 72.

At step 102, device 10 may use display 14 to prompt the user to select a measurement mode (e.g., a surface mapping mode, a volume mapping mode, a planar surface mapping mode, a curved surface mapping mode, etc.).

At step 104, a coordinate system may be established using device position data (e.g., device position data from positioning circuitry 47). Establishing the coordinate system may include establishing the coordinate system at the position and orientation of device 10 prior to gathering sample point data or while gathering sample point data.

At step 106, a laser such as laser 62 of laser sensor 32 may be turned on and laser sample data may be gathered for a sample point.

At step 108, device position data may be gathered while gathering the laser sample data for the sample point. As indicated by arrow 118, steps 106 and 108 may be repeated for any suitable number of sample points for a given surface or volume mapping operation (e.g., the mapping operations described above in connection with FIGS. 4, 5, and/or 6).

At step 110, sample point position data such as X, Y, and Z positions for each sample point in the established coordinate system may be generated. Generating the sample point position data for each sample point may include combining the gathered laser sample data and device position data from that sample point.

At step 112, device 10 may use, for example, display 14 to prompt the user to gather additional laser sample data and device position data at additional sample points. Step 112 may be performed if, for example, mapping application 72 is unable to compute the desired mapping data with the previously gathered sample data (e.g., if only three sample points were gathered while mapping a curved surface).

At step 114, the generated sample point position data (e.g., the X, Y, and Z positions of each sample point in the established coordinate system) for multiple sample points may be combined to generate output data (e.g., mapping data such as surface data, volume data, distance data, square footage data, virtual image data, etc.) for output or for display to the user.

At step 116, the generated output data may be provided (e.g., displayed) to the user. If desired, at step 116, the generated output data may also be stored or transmitted to other devices.

Figure 11:
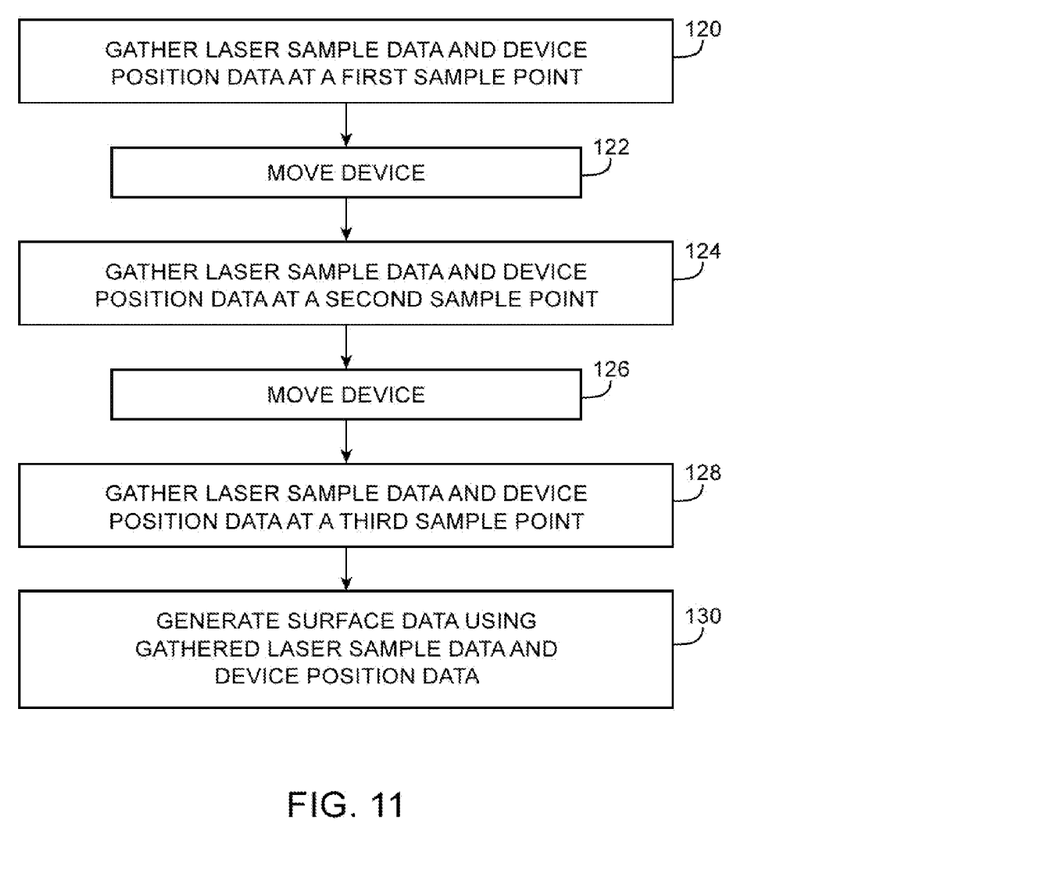
FIG. 11 is a flow chart of illustrative steps involved gathering mapping data from multiple device positions using an electronic device with mapping circuitry that includes positioning circuitry in accordance with an embodiment of the present invention.

In one suitable example, device 10 may be used to map a single planar surface such as a wall. FIG. 11 is a flow chart of illustrative steps that may be used in mapping a single planar surface.

At step 120, laser sample data and device position data at a first sample point on the single planar surface may be gathered using a device having mapping circuitry such as device 10 while the device is in a first device position. A coordinate system may also be established that corresponds to the first device position or to the center of another (global) coordinate system that has been previously established. Laser sample data may be gathered using laser sensor 32 and device position data may be gathered using device positioning circuitry 47 as described above in connection with, for example, FIGS. 3 and 4. Laser sample data may include the distance between the device and the first sample point. Device position data may include x, y, z, theta_1, theta_2, and theta_3 position and orientation data for the device.

At step 122, the device may be moved to a second device position. Moving the device may include changing the position and/or the orientation of the device.

At step 124, laser sample data and device position data at a second sample point on the single planar surface may be gathered while the device is in the second device position.

At step 126, the device may be moved to a third device position.

At step 128, laser sample data and device position data at a third sample point on the single planar surface may be gathered while the device is in the third device position.

At step 130, surface data such as an equation describing the location and position of the single planar surface in the established coordinate system, a virtual image of the single planar surface in the established coordinate system, or other surface data may be generated using the gathered laser sample data and device position data from the first, second, and third sample points.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a laser sensor having a light-emitting component and a light sensor, wherein the laser sensor generates laser sample data with the light-emitting component and the light sensor at a plurality of sample points;
   device position detection circuitry that monitors a device position and a device orientation, wherein the device position detection circuitry generates device position data based on the device position and the device orientation at each of the plurality of sample points while the laser sensor generates the laser sample data; and
   storage and processing circuitry that combines the laser sample data gathered at each of the plurality of sample points with the device position data gathered at each of the plurality of sample points to generate position data for each of the plurality of sample points.

2. The electronic device defined in claim 1, further comprising a housing having an opening, wherein the light-emitting component of the laser sensor includes a laser that is operable to emit a laser beam through the opening.

3. The electronic device defined in claim 2 wherein the light sensor senses reflected portions of the laser beam that have passed back through the opening.

4. The electronic device defined in claim 3, further comprising a display.

5. The electronic device defined in claim 4, further comprising wireless communications circuitry.

6. The electronic device defined in claim 5 wherein the wireless communications circuitry comprises at least one antenna.

7. The electronic device defined in claim 1 wherein the electronic device is a wearable electronic device and wherein the device position circuitry comprises an accelerometer and a gyroscope.

8. A method of operating an electronic device that has mapping circuitry that includes a laser sensor and device position detection circuitry, the method comprising:
   gathering laser sample data at a plurality of sample points using the laser sensor;
   gathering device position data at each of the plurality of sample points using the device position detection circuitry; and
   generating mapping data by combining the laser sample data gathered at each of the plurality of sample points and the device position data gathered at each of the plurality of sample points to generate position data for each of the plurality of sample points.

9. The method defined in claim 8 wherein the laser sensor comprises a laser and a light sensor and wherein gathering the laser sample data comprises:
   generating a laser beam using the laser; and
   detecting a reflected portion of the generated laser beam using the light sensor; and
   determining a distance to a surface using the detected reflected portion of the generated laser.

10. The method defined in claim 9 wherein the device position detection circuitry comprises at least one gyroscope and at least one accelerometer and wherein gathering the device position data comprises determining a position and an orientation of the electronic device using the at least one gyroscope and the at least one accelerometer.

11. The method defined in claim 10 wherein at each sample point, the laser beam is pointed at a different position on the surface.

12. The method defined in claim 11 wherein gathering the device position data comprises gathering the device position data while gathering the laser sample data at the plurality of sample points.

13. The method defined in claim 8 wherein generating the mapping data by combining the laser sample data and the device position data further comprises combining the generated position data for multiple sample points.

14. The method defined in claim 8 wherein the electronic device further comprises storage and processing circuitry, the method further comprising:
   activating a mapping application using the storage and processing circuitry.

15. The method defined in claim 14, further comprising:
   providing laser data from the laser sensor to an additional laser feedback application.

16. The electronic device defined in claim 8 wherein gathering the laser data comprises measuring a distance from the electronic device to an object, wherein gathering the device position data comprises gathering three-dimensional location data with an accelerometer and generating angular orientation data with a gyroscope, and wherein combining the laser data and the device position data comprises associating the laser data with a position of the electronic device relative to the object.

17. A cellular telephone, comprising:
   a housing having an opening;
   a laser sensor mounted within the housing, wherein the laser sensor comprises a laser configured to emit a laser beam through the opening, and wherein the laser sensor generates laser sample data at a plurality of sample points;
   device positioning circuitry that generates device position data at each of the plurality of sample points; and
   storage and processing circuitry configured to combine the laser sample data generated by the laser sensor at each of the plurality of sample points with the device position data generated by the device positioning circuitry at each of the plurality of sample points to generate position data for each of the plurality of sample points.

18. The cellular telephone defined in claim 17 wherein the opening comprises an opening for an audio jack.

19. The cellular telephone defined in claim 18, further comprising a display, wherein the storage and processing circuitry is configured to generate mapping data associated with one or more objects in a surrounding environment using the laser sample data and the device position data and to display the mapping data to a user with the display.

* * * * *

UNITED STATES PATENT AND TRADEMARK OFFICE
CERTIFICATE OF CORRECTION

PATENT NO. : 9,456,307 B2  
APPLICATION NO. : 13/904838  
DATED : September 27, 2016  
INVENTOR(S) : Vivek Katiyar et al.

Page 1 of 1

It is certified that error appears in the above-identified patent and that said Letters Patent is hereby corrected as shown below:

In the Claims

Column 12, Line 27, In Claim 16, Line 1, "The electronic device" should read --The method--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*